US010488220B2

(12) United States Patent
Patel

(10) Patent No.: US 10,488,220 B2
(45) Date of Patent: Nov. 26, 2019

(54) NAVIGATION SYSTEM WITH DEVICE OPERATION MECHANISM AND METHOD OF OPERATION THEREOF

(71) Applicant: Telenav, Inc., Santa Clara, CA (US)

(72) Inventor: Amit Patel, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 115 days.

(21) Appl. No.: 15/262,260

(22) Filed: Sep. 12, 2016

(65) Prior Publication Data
US 2018/0073890 A1    Mar. 15, 2018

(51) Int. Cl.
*G01C 21/36* (2006.01)
*G08B 21/18* (2006.01)

(52) U.S. Cl.
CPC ......... *G01C 21/3691* (2013.01); *G01C 21/36* (2013.01); *G01C 21/3655* (2013.01); *G01C 21/3697* (2013.01); *G08B 21/182* (2013.01)

(58) Field of Classification Search
CPC ............ G01C 21/3691; G01C 21/3655; G08B 21/182
See application file for complete search history.

(56) References Cited

U.S. PATENT DOCUMENTS

| 2012/0046019 | A1* | 2/2012 | Rodkey, Jr. ....... | H04M 1/72577 455/418 |
| 2013/0275038 | A1 | 10/2013 | Hania et al. | |
| 2015/0179062 | A1* | 6/2015 | Ralston ................. | G01C 21/26 701/117 |
| 2015/0191122 | A1* | 7/2015 | Roy ..................... | G08G 1/0962 340/439 |
| 2015/0274074 | A1* | 10/2015 | Petrillo .................... | B60R 1/00 701/36 |
| 2016/0223353 | A1* | 8/2016 | Shin .................... | G01C 21/3697 |

FOREIGN PATENT DOCUMENTS

| WO | 2011038265 A1 | 3/2011 | |
| WO | WO-2011038265 A2 * | 3/2011 | ............. G01S 19/34 |

* cited by examiner

*Primary Examiner* — Alan D Hutchinson
(74) *Attorney, Agent, or Firm* — Perspectives Law Group, Corp.

(57) ABSTRACT

A method of operation of a navigation system includes: determining a surrounding condition with a control unit for selecting an input source to capture a surrounding object; determining an operating context based on calculating an average stopped time meeting or exceeding a time threshold within the surrounding condition; determining a feature availability based on the operating context for restricting a device feature available on a device; and delivering an alert notification based on an object count below a count threshold for presenting on the device.

20 Claims, 6 Drawing Sheets

NAVIGATION SYSTEM WITH DEVICE OPERATION MECHANISM AND METHOD OF OPERATION THEREOF

TECHNICAL FIELD

The present invention relates generally to a navigation system, and more particularly to a system with device operation mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system improving device operation mechanism to control a device during operation of vehicle has become a paramount concern for the consumer. The inability decreases the benefit of using the tool.

Thus, a need still remains for a navigation system with device operation mechanism to a device during operation of vehicle. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a surrounding condition with a control unit for selecting an input source to capture a surrounding object; determining an operating context based on calculating an average stopped time meeting or exceeding a time threshold within the surrounding condition; determining a feature availability based on the operating context for restricting a device feature available on a device; and delivering an alert notification based on an object count below a count threshold for presenting on the device.

The present invention provides a navigation system, including: a control unit for: determining a surrounding condition with a control unit for selecting an input source to capture a surrounding object; determining an operating context based on calculating an average stopped time meeting or exceeding a time threshold within the surrounding condition; determining a feature availability based on the operating context for restricting a device feature available on a device; and a communication unit, coupled to the control unit for delivering an alert notification based on an object count below a count threshold for presenting on the device.

The present invention provides a navigation system having a non-transitory computer readable medium including: determining a surrounding condition for selecting an input source to capture a surrounding object; determining an operating context based on calculating an average stopped time meeting or exceeding a time threshold within the surrounding condition; determining a feature availability based on the operating context for restricting a device feature available on a device; and delivering an alert notification based on an object count below a count threshold for presenting on the device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
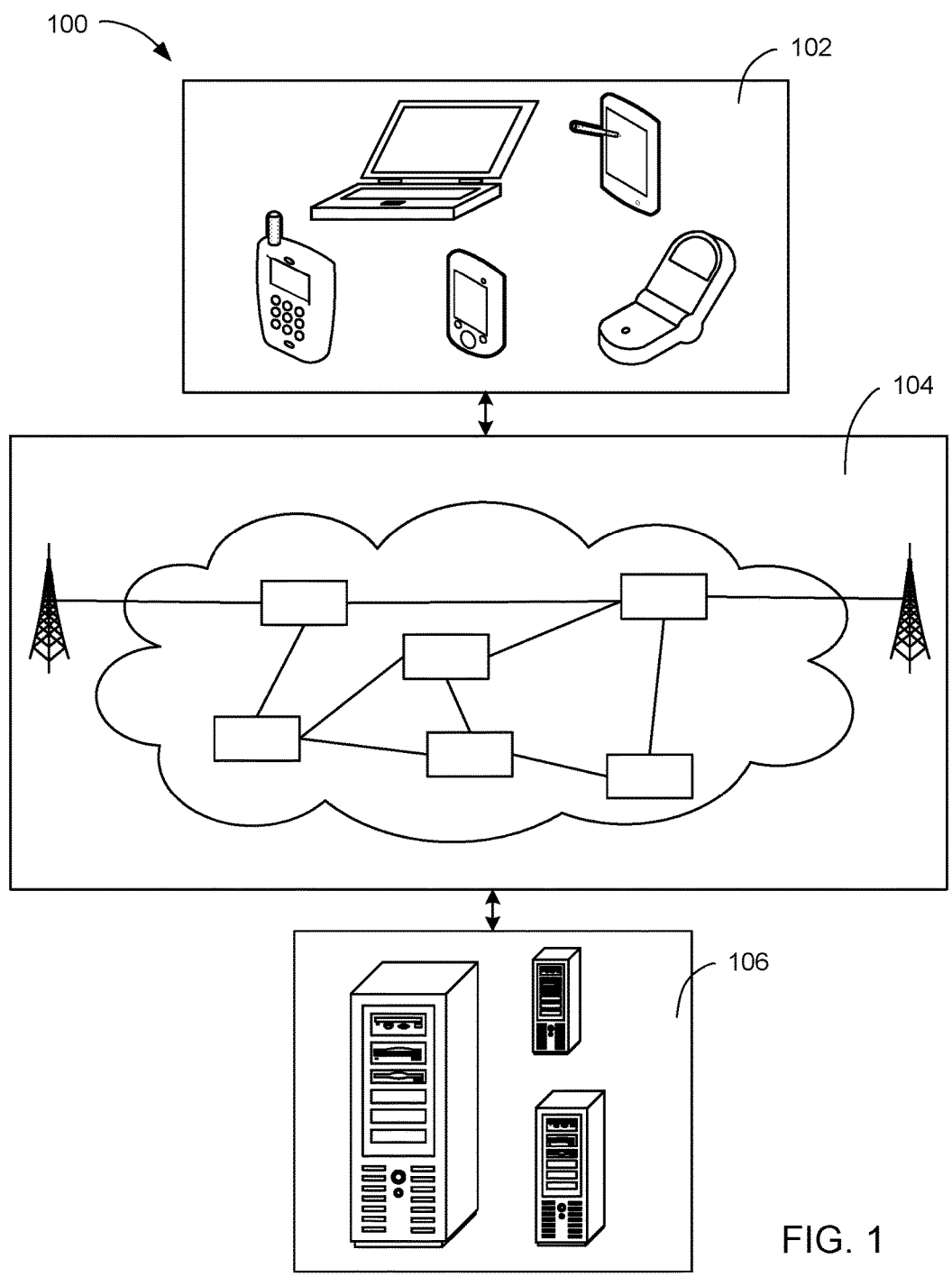
FIG. 1 is a navigation system with device operation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown a navigation system 100 with device operation mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, a head unit, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
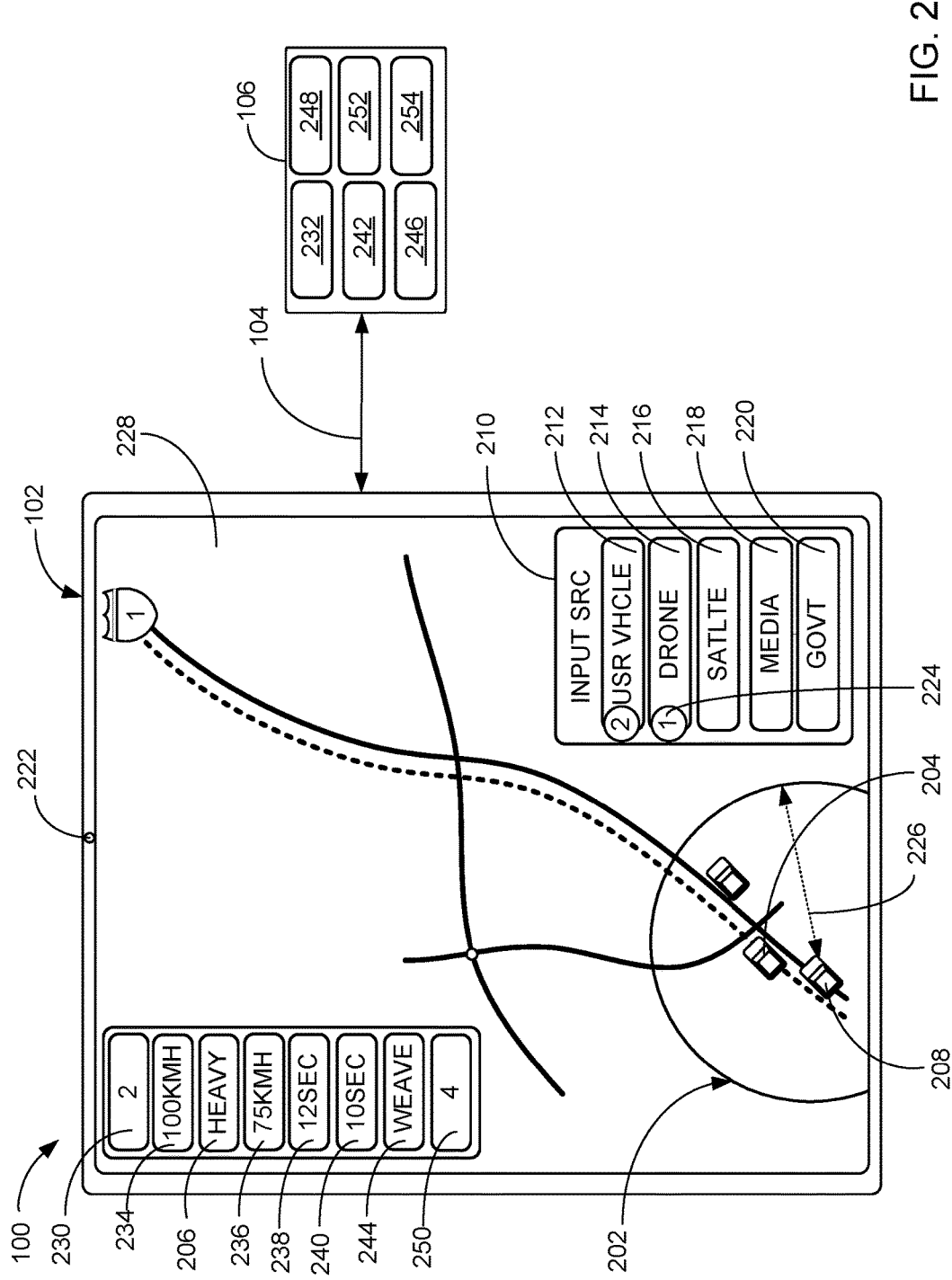
FIG. 2 is an example of information presented by the navigation system.

Referring now to FIG. 2, there is shown an example of information presented by the navigation system 100. For clarity and brevity, the discussion of the embodiment of the present invention will focus on the first device 102 delivering the result generated by the navigation system 100. However, the second device 106 and the first device 102 can be discussed interchangeably. The first device 102 and the second device 106 can communicate via the communication path 104.

A surrounding condition 202 is defined as a situation or environment surrounding the first device 102. For example, the surrounding condition 202 can include a surrounding object 204, a traffic condition 206, a current location 208, a geographic area, or a combination thereof. The geographic area can include a geographic region where the user of the first device 102 is traveling currently, had traveled, or will be traveling to. The current location 208 is defined as a physical location where the first device 102 is detected. The traffic condition 206 is defined as a severity of traffic congestion. The traffic condition 206 can include standstill, heavy, moderate, light, or free flow.

The surrounding object 204 is defined as a thing. For example, the surrounding object 204 can including animate thing, inanimate thing, or a combination thereof in the surrounding condition 202. For further example, the surrounding object 204 can include a mobile object, an immobile object, or a combination thereof. For a specific example, the surrounding object 204 can represent a person. For a different example, the surrounding object 204 can represent another vehicle.

The navigation system 100 can determine the surrounding condition 202 using an input source 210. The input source 210 is defined as a provider of information. For example, the input source 210 can provide information related to the surrounding condition 202.

For example, the input source 210 can include the first device 102, a user's vehicle 212, a drone 214, a satellite 216, a media source 218, a government source 220, or a combination thereof. The input source 210 can include a capturing device 222. A source priority level 224 is defined as a level of importance of the input source 210.

For example, the input source 210 representing the first device 102 can have the source priority level 224 that is higher than the input source 210 representing the media source 218. The first device 102 can include a mobile device, such as a smartphone, a head unit installed in a vehicle, or a combination thereof. The user's vehicle 212 can represent a transportation mean operated by a user. The user's vehicle 212 can represent the first device 102 itself or have the first device 102 connected.

The drone 214 is defined as a flying object controlled by a person from the ground. The satellite 216 is defined as an object sent into space to orbit around the Earth. The media source 218 is defined as a provider of information using means of communication including radio, television, newspaper, magazine, internet, or a combination thereof to reach people widely. The government source 220 can represent an authority that establishes rules and regulations to control a population.

The capturing device 222 can include a digital camera, video camera, thermal camera, night vision camera, infrared camera, x-ray camera, or the combination thereof. For example, the input source 210 can use the capturing device 222 to capture the surrounding condition 202. For a specific example, the input source 210 can represent the first device 102 with the capturing device 222 representing the digital camera to capture the image of another vehicle. For another example, the drone 214, the satellite 216, or a combination thereof can include the capturing device 222 to capture the surrounding condition 202 within a vicinity 226.

The vicinity 226 is defined as a predefined geographic area. For example, the vicinity 226 can be predefined based on a radius from the current location 208. For a different example, the vicinity 226 can be predefined based a geographic boundary established by geographic borderline such as city limit, county limit, state limit, prefecture limit, country border, or a combination thereof.

An operating context 228 is defined as a surrounding circumstance. For example, the operating context 228 can represent the circumstance surrounding the user when operating the first device 102. For a specific example, the operating context 228 can represent whether the surrounding condition 202 is safe or unsafe to operate the first device 102.

The operating context 228 can be determined based on considering variety of factors including the surrounding condition 202. An object count 230 is defined as a number of the surrounding object 204 captured. For example, the object count 230 of another vehicle within the vicinity 226 of the first device 102 can be five. A count threshold 232 is defined as a limit for the object count 230 required. For example, the count threshold 232 can represent the maximum or minimum number of the object count 230.

A vehicle speed 234 is defined as a time rate of change of position. For example, the vehicle speed 234 of the user's vehicle 212 can represent 100 kilometers per hour. A predefined speed limit 236 is defined as a travel speed set by the government source 220. For example, the predefined speed limit 236 of the freeway can be set at 75 kilometers per hour.

A vehicle stopped time 238 is defined as a time duration of a vehicle with the vehicle speed 234 of zero kilometers per hour. For example, the time duration can be measured in seconds, minutes, hours, days, or a combination thereof. An average stopped time 240 is an average of multiple instances of the vehicle stopped time 238. For example, the average stopped time 240 can be calculated based on averaging a number of the vehicle stopped time 238 equal to the object count 230. A time threshold 242 is defined as a time requirement. For example, the time threshold 242 can represent a maximum or minimum time duration.

An operation pattern 244 is defined as one's tendency operating one's vehicle. For example, the operation pattern 244 can represent the user's operation habit of the vehicle including braking, weaving through traffic, speeding, or a combination thereof. A heading angle difference 246 is defined as a difference between one travel heading to another travel heading. As an example, the travel heading can represent a direction where the user's vehicle 212 is traveling towards. For example, the user's vehicle 212 can have the travel heading straight. Subsequently, the user's vehicle 212 can make a right turn at an intersection. The heading angle difference 246 between traveling straight and making a right turn can be 90 degrees. The heading angle difference 246 can range from 0 to 360 degrees in difference.

An operation threshold 248 is defined as a limit placed on one's behavior. For example, the operation threshold 248 can represent a maximum or minimum limit. For further example, the operation threshold 248 can represent the maximum amount of force used. For a different example, the operation threshold 248 can represent the maximum amount of the heading angle difference 246 tolerated to determine whether the user made significant change in the travel heading.

A safety level 250 is defined as a degree of danger or risk. More specifically as an example, the safety level 250 can range from safe to unsafe where the value of how safe or unsafe can be represented in different levels alphanumerically. For example, the safety level 250 for safe can represent 10 where the safety level 250 of unsafe for life threatening can represent 0. A safety threshold 252 is a required limit of the safety level 250. For example, the safety threshold 252 can represent a maximum or minimum level of the safety level 250.

A predefined percentage 254 is a proportion limit. For example, the predefined percentage 254 can represent maximum or minimum proportion. For example, the traffic condition 206 can include heavy or free flow. The traffic condition 206 can be considered heavy if the vehicle speed 234 is traveling at the predefined percentage 254 of 10% of the predefined speed limit 236. More specifically as an example, if the predefined speed limit 236 is 100 kilometers per hour, the vehicle speed 234 traveling at the predefined percentage 254 will be 10 kilometers per hour.

Figure 3:
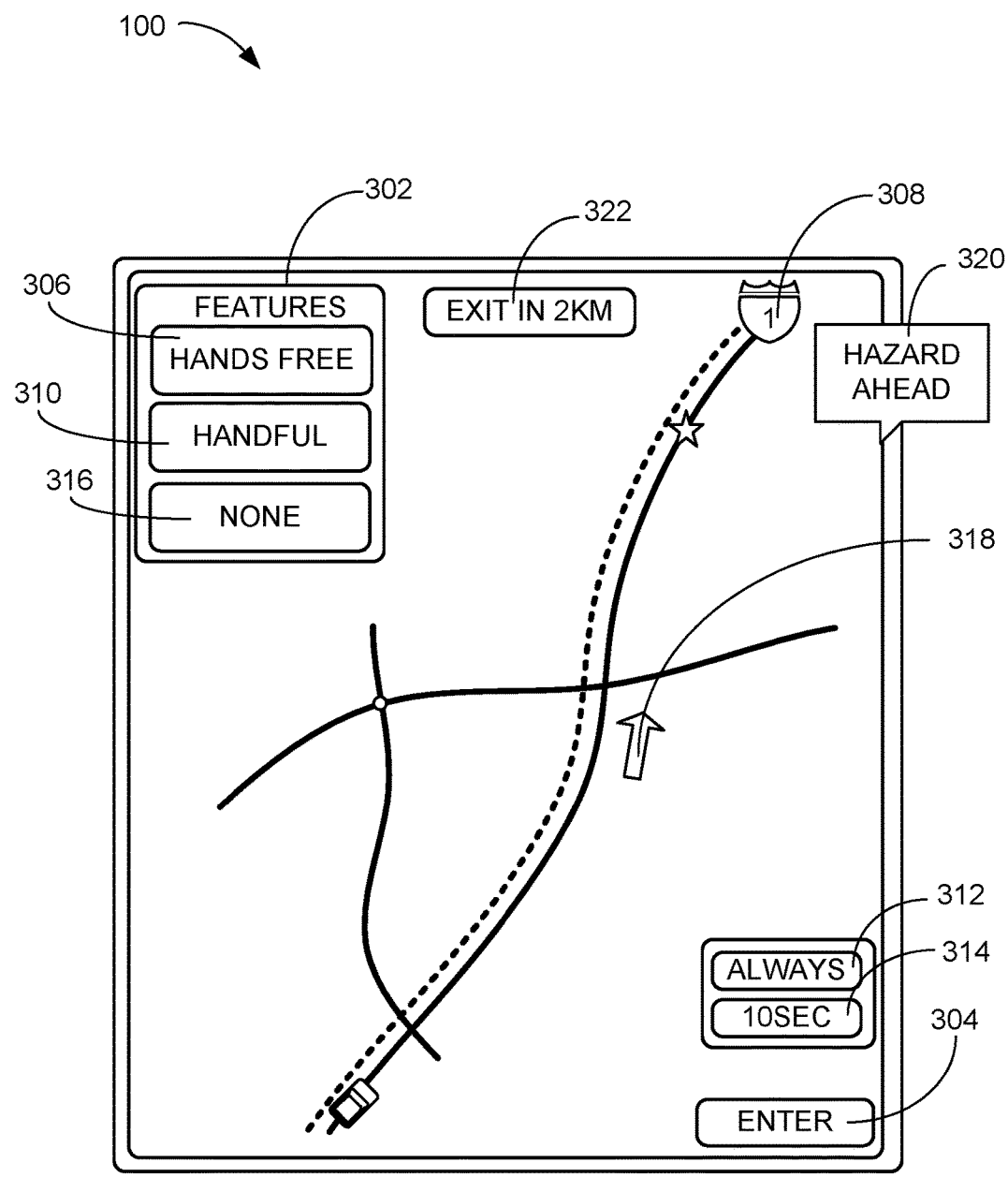
FIG. 3 is an example of a feature availability

Referring now to FIG. 3, there is shown an example of a feature availability 302. The feature availability 302 is defined as a function or functions available to use. For example, the feature availability 302 can represent an availability of a device feature 304 of the first device 102. The device feature 304 is defined as a function. For example, the device feature 304 can include a software function, hardware function, or a combination thereof of the first device 102. For further example, the feature availability 302 can include various types of the device feature 304 including manual entry, voice command, pausing, changing size of icon, pausing device functionality, disabling the device feature 304, or a combination thereof.

A hands free mode 306 is defined as an operation state of a device where manual access to the device is unavailable. For example, under the hands free mode 306, a manual entry such as typing on a user interface, selecting a presentation content 308, or a combination thereof on the first device 102 is unavailable. For further example, under the hands free mode 306, the user of the first device 102 can provide oral command, gesture, or a combination thereof to access the device feature 304. A handful mode 310 is defined as an operation state of a device where manual access to the device is available. For example, under the handful mode 310, a manual entry such as typing on a user interface, selecting a presentation content 308, or a combination thereof on the first device 102 is available.

The presentation content 308 is defined as information presented on the first device 102. For example, the presentation content 308 can include the device feature 304, software, text, image, video, audio, or a combination thereof. A presentation timing 312 is defined as an opportune time for presenting information. For example, the presentation timing 312 for presenting the presentation content 308 is when the operating context 228 of FIG. 2 is determined to be safe.

A presentation duration 314 is defined as a time duration of presenting information. For example, the presentation duration 314 can be measured in nanoseconds, seconds, minutes, hours, days, or a combination thereof. For further example, the presentation duration 314 can define the time duration to present the device feature 304, the presentation content 308, or a combination thereof.

A restriction level 316 is defined as a level of inaccessibility. For example, the restriction level 316 can be used to granularly control the access to the device feature 304, the presentation content 308, or a combination thereof. More specifically as an example, depending on the restriction level 316, the feature availability 302 can be restricted. The restriction level 316 can range from no access to total access and different levels of the restriction level 316 in between.

An alert notification 318 is defined as information delivered by the navigation system 100. For example, whenever the navigation system 100 would like to notify the user of the first device 102, the navigation system 100 can deliver the alert notification 318 to the first device 102. For a specific example, the alert notification 318 can include an audio notification 320, a visual notification 322, or a combination thereof.

The audio notification 320 is defined as information delivered in sound form. For example, the presentation content 308 of the audio notification 320 can include speech, music, sound, or a combination thereof. The visual notification 322 is defined as information delivered in visible form. For example, the presentation content 308 of the visual notification 322 can include text, image, video, or a combination thereof.

Figure 4:
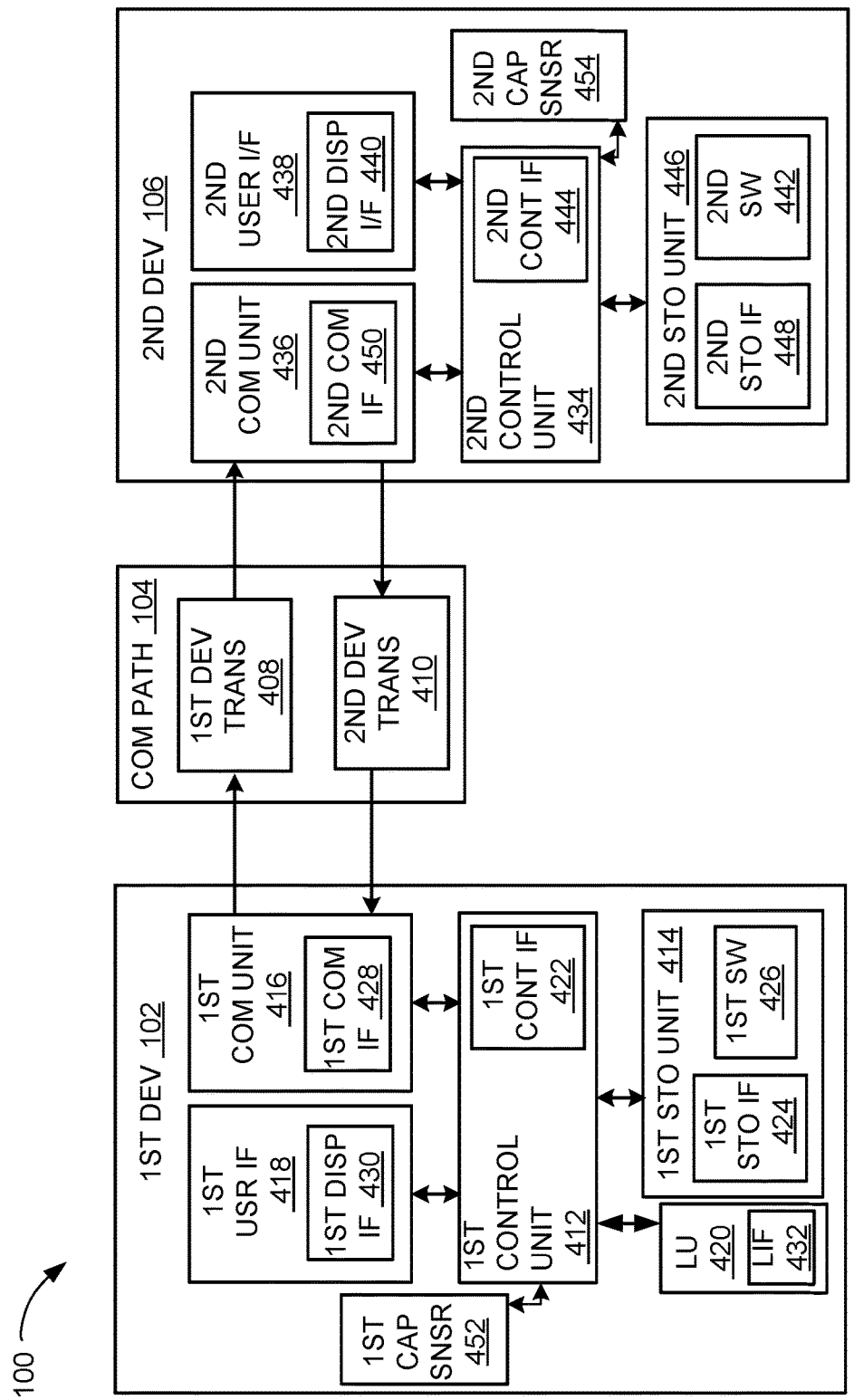
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

A first capturing sensor 452 can be the capturing device 222 of FIG. 2. Examples of the first capturing sensor 452 can include a digital camera, video camera, thermal camera, night vision camera, infrared camera, x-ray camera, or the combination thereof. Examples of the first capturing sensor 452 can further include accelerometer, thermometer, microphone, wireless signal receiver, remote physiological monitoring device, light identifier, or the combination thereof.

A third capturing sensor 454 can be the capturing device 222. Examples of the second third sensor 454 can include a digital camera, video camera, thermal camera, night vision camera, infrared camera, x-ray camera, or the combination thereof. Examples of the third capturing sensor 454 can further include accelerometer, thermometer, microphone, wireless signal receiver, remote physiological monitoring device, light identifier, or the combination thereof.

Figure 5:
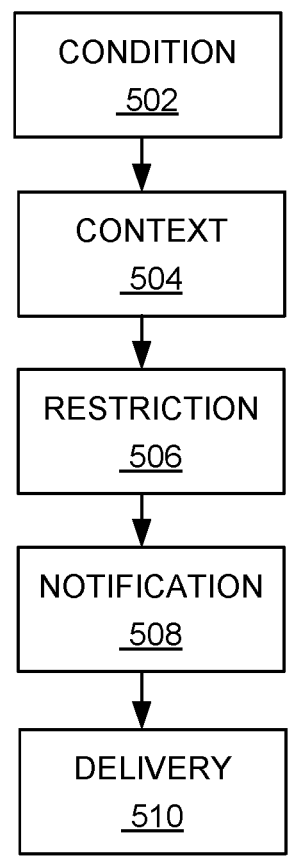
FIG. 5 is a control flow of the navigation system.

Referring now to FIG. 5, therein is shown a control flow of the navigation system 100. The navigation system 100 can include a condition module 502. The condition module 502 determines the surrounding condition 202 of FIG. 2. For example, the condition module 502 can determine the surrounding condition 202 based on the input source 210 of FIG. 2, the surrounding object 204 of FIG. 2, the current location 208 of FIG. 2, or a combination thereof.

The condition module 502 can determine the surrounding condition 202 in a number of ways. For example, the condition module 502 can determine the surrounding condition 202 based on selecting an instance or multiple instances of the input source 210 including the drone 214 of FIG. 2, the capturing device 222 of FIG. 2, the first device 102 of FIG. 1, the user's vehicle 212 of FIG. 2, the satellite 216 of FIG. 2, the media source 218 of FIG. 2, the government source 220 of FIG. 2, or a combination thereof.

For a specific example, the condition module 502 can determine the surrounding condition 202 including the traffic condition 206 of FIG. 2 representing the traffic jam. More specifically as an example, the input source 210 representing the media source 218, the government source 220, or a combination thereof can provide the traffic condition 206 via the communication path 104 of FIG. 1 to the first communication unit 416 of FIG. 4 regarding the surrounding condition 202 of the current location 208. Based on the surrounding condition 202, the input source 210, or a combination thereof, the condition module 502 can determine the surrounding condition 202 of the user is in the traffic jam.

For a different example, the condition module 502 can determine the surrounding condition 202 based on the data captured by the drone 214, the satellite 216, the first device 102, the user's vehicle 212, or a combination thereof. More specifically as an example, the drone 214 can fly within the vicinity 226 of FIG. 2 of the user's vehicle 212. The satellite 216 can orbit above the current location 208. The drone 214, the satellite 216, first device 102, the user's vehicle 212, or a combination thereof can include the capturing device 222 to capture the surrounding condition 202 of the current location 208. The surrounding condition 202 captured can be limited to the vicinity 226 of the current location 208. The vicinity 226 can include 360 degrees surrounding the current location 208 from above, front, back, left, right, or a combination thereof of the user's vehicle 212 with the first device 102.

The capturing device 222 can capture the surrounding object 204 surrounding the current location 208 as a digital image, an infrared image, a radio signal, a video stream, or a combination thereof. Based on the surrounding object 204 captured, the condition module 502 can, for example, perform an image recognition algorithm to determine that the surrounding object 204 to represent the mobile object, the immobile object, or a combination thereof. The mobile object can represent the surrounding object 204 that can move. The immobile object can represent the surrounding object that is stationary.

For example, the mobile object can include another vehicle, person, animal, or a combination thereof. The immobile object can include traffic controller, tree, road divider, or a combination thereof. Based on the surrounding object surrounding the current location 208, the condition module 502 can determine the surrounding condition 202 of the user of the first device 102.

More specifically as an example, the multiple instances of the surrounding object 204 determined can include a combination of mobile objects and immobile objects representing another vehicles, traffic light, lane dividers, shoulder of the road, or a combination thereof. The current location 208 determined can represent that the first device 102 is on a freeway. As a result, the condition module 502 can determine the surrounding condition 202 to represent that the user is on a freeway.

In contrast, the multiple instances of the surrounding object 204 determined can include a combination of mobile objects and immobile objects representing people, trees, rocks, or a combination thereof. The current location 208 determined can represent that the first device 102 is in a national park. As a result, the condition module 502 can determine the surrounding condition 202 to represent that the user is traveling in a national park. The condition module 502 can transmit the surrounding condition 202 to a context module 504.

It has been discovered that capturing the surrounding object 204 based on various sources of the input source 210 improves the efficiency and accuracy of the ability of the navigation system 100, the first device 102, or a combination thereof to determine the surrounding condition 202. By having different kinds of the input source 210 such as the first device 102, the drone 214, the satellite, or a combination thereof, the navigation system 100 can capture the surrounding object 204 dynamically and in real time under various environmental conditions accurately. As a result, the navigation system 100 can determine the surrounding condition 202 more accurately and efficiently for improved operation of the navigation system 100, the first device 102, the user's vehicle 212, or a combination thereof.

The navigation system 100 can include the context module 504, which can be coupled to the condition module 502. The context module 504 determines the operating context 228 of FIG. 2. For example, the context module 504 can determine the operating context 228 based on the input source 210, the surrounding condition 202, the surrounding object 204, the current location 208, or a combination thereof.

The context module 504 can determine the operating context 228 in a number of ways. For example, the context module 504 can determine the operating context 228 based on the object count 230 of FIG. 2 of the surrounding object 204 meeting, exceeding, or under the count threshold 232 of FIG. 2. More specifically as an example, the surrounding condition 202 can include multiple instances of the surrounding object 204 representing another vehicles. The context module 504 can determine the object count 230 based on calculating the number of license plate, brake lights turned on or off, or a combination thereof.

For further example, the context module 504 can determine the operating context 228 that the vehicle is at the vehicle speed 234 of FIG. 2 of zero kilometer per hour if the object count 230 of another vehicles with the brake light turned on meets or exceeds the count threshold 232. More specifically as an example, the context module 504 can calculate the average stopped time 240 of FIG. when the object count 230 meets or exceeds the count threshold 232. The context module 504 can calculate the vehicle stopped time 238 of FIG. 2 based on tracking the brake light being turned on with the capturing device 222 and detecting the light is turned on based on the image recognition algorithm. The context module 504 can calculate multiple instances of the vehicle stopped time 238 for another vehicles. The context module 504 can calculate the average stopped time 240 based on averaging each instance of the vehicle stopped time 238. The context module 504 can determine the operating context 228 to be safe if the average stopped time 240 meets or exceeds the time threshold 242 of FIG. 2, the object count 230 meets or exceeds the count threshold 232, or a combination thereof. The time threshold 242, for example, can be ten seconds.

It has been discovered that factoring the average stopped time 240 meets or exceeds the time threshold 242 of FIG. 2, the object count 230 meets or exceeds the count threshold 232, or a combination thereof improves the efficiency and accuracy of the ability of the navigation system 100, the first device 102, or a combination thereof to determine the operating context 228. By considering the average stopped time 240 and the object count 230, the navigation system 100 can accurately determine whether the user's vehicle 212 is surrounded by other vehicles that are also stopped. As a result, the navigation system 100 can determine whether the operating context 228 is safe or unsafe for safer operation of the navigation system 100, the first device 102, the user's vehicle 212, or a combination thereof.

For a different example, the context module 504 can determine the operating context 228 based on the vehicle speed 234, the operation pattern 244 of FIG. 2, or a combination thereof. For example, based on the vehicle speed 234 meeting, exceeding, or under the predefined speed limit 236 of FIG. 2, the context module 504 can determine the operating context 228 to be safe to operate the first device 102 or not.

For a specific example, the predefined speed limit 236 can base on the traffic condition 206. More specifically as an example, the traffic condition 206 can include standstill, heavy, moderate, light, or free flow. The free flow can represent the traffic condition 206 where the vehicle speed 234 is traveling at or above the speed limit regulated by the government.

Continuing with the example, the context module 504 can determine the operating context 228 to be safe when the vehicle speed 234 is at the predefined speed limit 236 equal to the traffic condition 206 representing the standstill or 0 kilometers per hour. For another example, the context module 504 can determine the operating context 228 to be safe when the vehicle speed 234 is at or below the predefined speed limit 236 representing the traffic condition 206 of heavy or the predefined percentage 254 of FIG. 2 below the predefined speed limit 236. For example, the predefined percentage 254 can represent 10% of the speed limit.

For further example, the context module 504 can determine the operating context 228 to be unsafe to operate the first device 102 when the vehicle speed 234 is meeting or exceeding the predefined speed limit 236 equal to the traffic condition 206 representing moderate, light, or free flow where the vehicle speed 234 is at the predefined percentage 254 above the speed limit. For example, the predefined percentage 254 can represent at least 20% above the speed limit.

For a different example, the context module 504 can determine the operating context 228 based on the operation pattern 244, the heading angle difference 246 of FIG. 2, the operation threshold 248 of FIG. 2, or a combination thereof. For example, the operation pattern 244 can represent the user's operation habit of the vehicle including braking, weaving through traffic, speeding, or a combination thereof.

More specifically as an example, the operation pattern 244 can represent the level of force used for braking to decrease the vehicle's speed. The operation threshold 248 can represent the limit placed on the force used by the user for braking. The context module 504 can determine the operating context 228 to be unsafe if the operation pattern 244 meets or exceeds the operation threshold 248. For example, if the force used to brake the vehicle meets or exceeds the limit of force defined for braking, the context module 504 can determine the operation pattern 244 to represent hard braking. As a result, the context module 504 can determine the operating context 228 to represent unsafe.

For further example, the context module 504 can determine the operating context 228 based on the heading angle difference 246 meeting, exceeding, or below the operation threshold 248. More specifically as an example, the operation threshold 248 can represent the limit of changes in angle from steering a vehicle. For example, if the heading angle difference 246 meets or exceeds the operation threshold 248, the context module 504 can determine the operating context 228 to represent unsafe. If the heading angle difference 246 is below the operation threshold 248, the context module 504 can determine the operating context 228 to represent safe.

For another example, the context module 504 can determine the operating context 228 ranging from safe to unsafe. For further example, the operating context 228 for unsafe can be granularly classified according to the safety level 250 of FIG. 2. The context module 504 can determine the operating context 228 based on the safety level 250 meeting or exceeding the safety threshold 252 of FIG. 2.

For a specific example, the context module 504 can determine the safety level 250 of the traffic condition 206 representing heavy to meet or exceed the safety threshold 252 or to be more safe than the traffic condition of free flow because the vehicle speed 234 can be lower than the predefined speed limit 236 when the traffic condition 206 is heavy. For another example, the context module 504 can determine the safety level 250 to meet or exceed the safety threshold 252 when the object count 230 of another vehicles is below the count threshold 232 or to be safer than the object count 230 meets or exceeds the count threshold 232 because there are fewer vehicles surrounding the first device 102. For additional example, the context module 504 can determine the safety level 250 to meet or exceed the safety threshold 252 of when the heading angle difference 246 is below the operation threshold 248 or to be safer than when the heading angle difference 246 meets or exceeds the operation threshold 248 because the vehicle operated by the user is not making a sharp turn.

The context module 504 can determine the operating context 228 based on considering each factor discussed above independently or in combination. The context module 504 can transmit the operating context 228 to a restriction module 506.

It has been discovered that determining the operation pattern 244 based on the heading angle difference 246 meeting, exceeding, or below the operation threshold 248 improves the efficiency and accuracy of the ability of the navigation system 100, the first device 102, or a combination thereof to determine the operating context 228. By considering the operation pattern 244 and the heading angle difference 246, the navigation system 100 can accurately determine whether the user's vehicle 212 is in the operating context 228 where the user should focus on operating the user's vehicle 212 or not. As a result, the navigation system 100 can determine whether the operating context 228 is safe or unsafe for safer operation of the navigation system 100, the first device 102, the user's vehicle 212, or a combination thereof.

The navigation system 100 can include the restriction module 506, which can be coupled to the context module 504. The restriction module 506 determines the feature availability 302 of FIG. 3. For example, the restriction module 506 can determine the feature availability 302 of the device feature 304 of FIG. 3 based on the operating context 228, the input source 210, or a combination thereof.

The restriction module 506 can determine the feature availability 302 in a number of ways. For example, the restriction module 506 can change or update the feature availability 302 according to the operating context 228. More specifically as an example, the restriction module 506 can determine the restriction level 316 of FIG. 3 to change the feature availability 302 of the first device 102 according to the operating context 228.

For a specific example, the feature availability 302 can include the hands free mode 306 of FIG. 3, the handful mode 310 of FIG. 3, or a combination thereof. Based on the operating context 228 of safe or unsafe, the restriction module 506 can determine the restriction level 316 to granularly control the feature availability 302 during the hands free mode 306, the handful mode 310, or a combination thereof.

More specifically as an example, the operating context 228 can represent safe. As a result, the restriction module 506 can determine the feature availability 302 to operate the first device 102 to include the hands free mode 306, the handful mode 310, or a combination thereof. Furthermore, the restriction module 506 can determine the restriction level 316 to represent no restriction for allowing access to all of the device feature 304 on the first device 102.

In contrast, the operating context 228 can represent unsafe. Continuing with the example, the operating context 228 can represent unsafe with the safety level 250 of 0. As a result, the restriction module 506 can determine the feature availability 302 to operate the first device 102 to include none of the hands free mode 306, the handful mode 310, or a combination thereof as the operating context 228 can represent too unsafe to operate the first device 102. Furthermore, the restriction module 506 can determine the restriction level 316 to represent complete restriction to disable all of the device feature 304 on the first device 102 to be inaccessible.

Continuing further with the example, as discussed above, the safety level 250 can range between safe to life threatening. The restriction module 506 can determine the restriction level 316 of the device feature 304 based on the operating context 228.

For a specific example, the operating context 228 can represent safe based on the average stopped time 240 meeting or exceeding the time threshold 242. However, the object count 230 of another vehicles is meeting or exceeding the count threshold 232. Since there are multiple instances of the surrounding object 204 representing another vehicle, the restriction module 506 can determine the restriction level 316 to be more restrictive than if the object count 230 is below the count threshold 232.

For a specific example, the restriction module 506 can determine the feature availability 302 for the device feature 304 to represent voice command without manual entry when the object count 230 meets or exceeds the count threshold 232. In contrast, the restriction module 506 can determine the feature availability 302 to allow manual entry if the object count 230 is below the count threshold 232.

For a different example, the operating context 228 can represent unsafe based on the heading angle difference 246 meeting or exceeding the operation threshold 248. As a result, the restriction module 506 can change the feature availability 302 by enlarging the icon available on the first device 102 than when the heading angle difference 246 is below the operation threshold 248 to allow user to see the presentation content 308 of FIG. 3 on the first device 102 under a condition that may be more unsafe.

For further example, the restriction module 506 can change the feature availability 302 by changing the presentation timing 312 of FIG. 3 and/or the presentation duration 314 of FIG. 3 of presenting the presentation content 308 on the first device 102 based on the operating context 228. The restriction module 506 can allow the presentation and/or increase the presentation duration 314 of the presentation of the presentation content 308 on the first device 102 if the operating context 228 is determined to be safe. More specifically as an example, the restriction module 506 can disallow the presentation and/or decrease the presentation duration 314 of the presentation of the presentation content 308 incrementally if the safety level 250 is below the safety threshold 252. The restriction module 506 can change the presentation duration 314 incrementally by increasing or decreasing the time duration by nanoseconds, seconds, minutes, hours, days, or a combination thereof. The restriction module 506 can change the feature availability 302 by increasing the number of the device feature 304 to be locked out based on the safety level 250 is below the safety threshold 252. The restriction module 506 can transmit the feature availability 302 to a notification module 508.

It has been discovered that determining the restriction level 316 based on the operating context 228 improves the efficiency and accuracy of the ability of the navigation system 100, the first device 102, or a combination thereof to determine the feature availability 302. By considering the operating context 228, the navigation system 100 can accurately determine whether the restriction level 316 is accurate to control the feature availability 302 of the first device 102. As a result, the navigation system 100 can control the feature availability 302 for safer operation of the navigation system 100, the first device 102, the user's vehicle 212, or a combination thereof.

The navigation system 100 can include the notification module 508, which can be coupled to the restriction module 506. The notification module 508 determines the alert notification 318 of FIG. 3. For example, the notification module 508 can determine the alert notification 318 based on the feature availability 302, the operating context 228, the safety level 250, or a combination thereof.

The notification module 508 can determine the alert notification 318 in a number of ways. For example, the operating context 228 can represent safe. The feature availability 302 can indicate that all options of the device feature 304 are available. The notification module 508 can determine that the alert notification 318 available to present on the first device 102 can include without restriction the audio notification 320 of FIG. 3, the visual notification 322 of FIG. 3, or a combination thereof.

In contrast, the operating context 228 can represent unsafe. The feature availability 302 can indicate that some of the options of the device feature 304 can be unavailable. The notification module 508 can determine that the alert notification 318 available to present on the first device 102 can be limited to the audio notification 320 to minimize distraction from viewing the visual notification 322.

For further example, the notification module 508 can determine the alert notification 318 based on the safety level 250. More specifically as an example, depending on the safety level 250, the notification module 508 can determine the combination of multiple of instances of the alert notification 318 to be presented on the first device 102. For example, if the safety level 250 meets or exceeds the safety threshold 252 or safe, the notification module 508 can determine the combination of the audio notification 320 and the visual notification 322 to be presented. In contrast, if the safety level 250 is blow the safety threshold 252 or unsafe, the notification module 508 can determine the alert notification 318 representing the audio notification 320 to be presented.

Continuing with the example, the notification module 508 can determine the presentation timing 312, the presentation duration 314, or a combination thereof of the alert notification 318 based on the safety level 250 of the operating context 228. More specifically as an example, if the safety level 250 meets or exceeds the safety threshold 252 or considered safe, the notification module 508 can determine the combination of the audio notification 320 and the visual notification 322 to be presented at the maximum time length for the presentation duration 314. Furthermore, the notification module 508 can determine the audio notification 320 and the visual notification 322 at the presentation timing 312 without restriction.

In contrast, if the safety level 250 is below the safety threshold 252, the notification module 508 can determine the presentation timing 312 of the audio notification 320, the visual notification 322, or a combination thereof to be presented when the user of the first device 102 had traveled to the geographic area where the safety level 250 meets or exceeds the safety threshold 252 subsequently. More specifically as an example, the notification module 508 can delay the presentation timing 312 of the audio notification 320, the visual notification 322, or a combination thereof until the operating context 228 is considered safe.

For further example, the notification module 508 can determine the presentation timing 312 of the audio notification 320 at the safety level 250 different from the visual notification 322. Moreover, the notification module 508 can stagger the presentation timing 312 of the audio notification 320, the visual notification 322, or a combination thereof by presenting the audio notification 320 at the safety level 250 that would be considered unsafe to present the visual notification 322. The notification module 508 can transmit the alert notification 318 including the audio notification 320, the visual notification 322, or a combination thereof to a delivery module 510.

The navigation system 100 can include the delivery module 510, which can be coupled to the notification module 508. The delivery module 510 delivers the alert notification 318. For example, the delivery module 510 can deliver the audio notification 320, the visual notification 322, or a combination thereof based on the operating context 228, the feature availability 302, the presentation timing 312, the presentation duration 314, or a combination thereof.

The delivery module 510 can deliver the alert notification 318 in a number of ways. For example, the delivery module 510 can deliver the alert notification 318 based on the object count 230 is below the count threshold 232. As discussed above, the number of brake lights turned on can determine that the first device 102 is in the operating context 228 where another vehicles surrounding the first device 102 are also stopped. If the object count 230 dips below the count threshold 232, the context module 504 can determine that the vehicle is no longer stopping, thus, the traffic is starting to move. As a result, the delivery module 510 can deliver the alert notification 318 to notify the user of the first device 102 that the traffic will start moving prior to the actual change in the traffic condition 206.

For another example, the delivery module 510 can deliver the alert notification 318 based on feature availability 302. More specifically as an example, the delivery module 510 can deliver the alert notification 318 to indicate the accessibility of the device feature 304. Moreover, if the operating context 228 changes from safe to unsafe, the delivery module 510 can deliver the alert notification 318 to notify the user that the restriction level 316 has risen to restrict the user from accessing certain instance of the device feature 304.

For additional example, the delivery module 510 can deliver the alert notification 318 based on the feature availability 302 including the presentation content 308 of the alert notification 318 changed according to the operating context 228. As discussed above, based on the safety level 250, the availability, the size, or a combination thereof of the presentation content 308 of the alert notification 318 can differ.

More specifically as an example, if the safety level 250 is below the safety threshold 252, the delivery module 510 can deliver the alert notification 318 including the presentation content 308 with larger size in font, image, or a combination thereof than the alert notification 318 of when the safety level 250 is at or exceeding the safety threshold 252. For another example, if the safety level 250 is below the safety threshold 252, the delivery module 510 can deliver the alert notification 318 including the presentation content 308 with less amount of information than the alert notification 318 of when the safety level 250 is at or exceeding the safety threshold 252.

For further example, the delivery module 510 can deliver the alert notification 318 based on the change in the safety level 250. As the safety level 250 changes, the feature availability 302 changes as different instances of the device feature 304 can become inaccessible. The delivery module 510 can deliver the alert notification 318 to notify which instance of the device feature 304 is now available since the safety level 250 has improved. On the contrary, the delivery module 510 can deliver the alert notification 318 to notify which instance of the device feature 304 is now unavailable since the safety level 250 has worsened.

For another example, the delivery module 510 can deliver the alert notification 318 based on the presentation timing 312, the presentation duration 314, or a combination thereof. More specifically as an example, the delivery module 510 can control the delivery of the alert notification 318 according to the presentation timing 312. If the operating context 228 is unsuitable for the visual notification 322 to be delivered, the delivery module 510 can deliver the audio notification 320 based on the presentation timing 312.

For illustrative purposes, the navigation system 100 is described with the condition module 502 determining the surrounding condition 202 based on the input source 210, the surrounding object 204, the current location 208, or a combination thereof, although it is understood that the condition module 502 can operate differently. For example, the condition module 502 can update the input source 210 based on the surrounding condition 202, the operating context 228, the source priority level 224 of FIG. 2, or a combination thereof.

The condition module 502 can update the input source 210 in a number of ways. For example, the condition module 502 can update the input source 210 based on the operating context 228. More specifically as an example, the operating context 228 can indicate that the surrounding condition 202 of the first device 102 is foggy. As a result, the input source 210 such as the drone 214 or the satellite 216 may not be effective to capture the surrounding condition 202 of the first device 102. As a result, the condition module 502 can update the input source 210 to include the capturing device 222 of the first device 102, the user's vehicle 212, the media source 218, the government source 220, or a combination thereof.

For a different example, the operating context 228 can indicate that the user with the first device 102 is stuck in the traffic condition 206 representing a traffic jam. As a result, the capturing device 222 of the first device 102, the user's vehicle 212, or a combination thereof can be ineffective to capture the surrounding condition 202 in greater radius. The condition module 502 can update the input source 210 to include the drone 214, the satellite 216, or a combination thereof to capture a greater instance of the vicinity 226 surrounding the current location 208 than the capturing device 222 of the first device 102, the user's vehicle 212, or a combination thereof.

For a different example, the condition module 502 can update the input source 210 based on the source priority level 224 of the input source 210. More specifically as an example, the condition module 502 can have the capturing device 222 of the first device 102 to be higher priority than other instances of the input source 210 to capture the surrounding condition 202. However, based on the changes in the operating context 228, the condition module 502 can dynamically change the source priority level 224 to update the input source 210. For example, in the operating context 228 representing the traffic jam, the condition module 502 can increase the source priority level 224 of the drone 214, the satellite 216, or a combination thereof to update the input source 210 to improve the capturing of the surrounding condition 202.

For illustrative purposes, the navigation system 100 is described with the context module 504 determining the operating context 228 based on the object count 230 of the surrounding object 204 meeting, exceeding, or under the count threshold 232, although it is understood that the context module 504 can operate differently. For example, the context module 504 can update the count threshold 232, the time threshold 242, the operation threshold 248, the safety threshold 252, or a combination thereof.

The context module 504 can update in a number of ways. For example, the context module 504 can update the count threshold 232, the time threshold 242, the operation threshold 248, the safety threshold 252, or a combination thereof based on the current location 208, the surrounding condition 202, or a combination thereof. The context module 504 can update by increasing or decreasing the count threshold 232, the time threshold 242, the operation threshold 248, the safety threshold 252, or a combination thereof.

For a specific example, the count threshold 232 for the surrounding condition 202 representing an interstate freeway can differ from the count threshold 232 for the surrounding condition 202 representing a local road. The count threshold 232 can be higher for the interstate freeway. If the current location 208 changes traveling from one road type to another road type, such as from the local road to the interstate freeway, the context module 504 can update the count threshold 232 to reflect the surrounding condition 202.

For another example, the time threshold 242 for the surrounding condition 202 representing an interstate freeway can differ from the time threshold 242 for the surrounding condition 202 representing a local road. The time threshold 242 can be longer in time duration on the interstate freeway. If the current location 208 changes traveling from one road type to another road type, such as from the local road to the interstate freeway, the context module 504 can update the time threshold 242 to reflect the surrounding condition 202.

For another example, the operation threshold 248 for the surrounding condition 202 representing the remote geographic area can differ from the operation threshold 248 for the surrounding condition 202 representing the urban geographic area. The geographic area can be considered remote if the land use including manmade structure of the geographic area is less than the usage threshold. The geographic area can be considered urban if the land use including manmade structure of the geographic area meets or exceeds the usage threshold. The usage threshold can represent a maximum or minimum percentage of manmade land use relative to the size of the geographic area.

The operation threshold 248 can be set at a lesser angle for the heading angle difference 246 in the remote geographic area including the national park, forest, mountain, cliff, canyon, seaside area, or a combination thereof to increase awareness by the context module 504 of less safe surroundings. If the current location 208 changes by traveling from one geographic area to another geographic area, such as from the urban geographic area to the remote geographic area, the context module 504 can update the operation threshold 248 to reflect the surrounding condition 202.

For another example, the safety threshold 252 for the surrounding condition 202 for one geographic area can differ from the safety threshold 252 for the surrounding condition 202 representing another geographic area. If the current location 208 changes by traveling from one geographic area to another geographic area, such as from the one geographic area to a higher crime rate geographic area, the context module 504 can update the safety threshold 252 to reflect the surrounding condition 202.

The physical transformation from determining the surrounding condition 202, the operating context 228, or a combination thereof results in the movement in the physical world, such as people using the first device 102, the vehicle, or a combination thereof, based on the operation of the navigation system 100. As the movement in the physical world occurs, the movement itself creates additional information that is converted back into determining the feature availability 302, the alert notification 318, or a combination thereof for the continued operation of the navigation system 100 and to continue the movement in the physical world.

The first software 426 of FIG. 4 of the first device 102 of FIG. 4 can include the modules for the navigation system 100. For example, the first software 426 can include the condition module 502, the context module 504, the restriction module 506, the notification module 508, and the delivery module 510. The first control unit 412 of FIG. 4 can execute the modules to perform the functions dynamically and in real time.

The first control unit 412 can execute the first software 426 for the condition module 502 to determine the surrounding condition 202. The first control unit 412 can execute the first software 426 for the context module 504 to determine the operating context 228.

The first control unit 412 can execute the first software 426 for the restriction module 506 to determine the feature availability 302. The first control unit 412 can execute the first software 426 for the notification module 508 to determine the alert notification 318. The first control unit 412 can execute the first software 426 for the delivery module 510 to deliver the alert notification 318.

The second software 442 of FIG. 4 of the first device 102 of FIG. 4 can include the modules for the navigation system 100. For example, the second software 442 can include the condition module 502, the context module 504, the restriction module 506, the notification module 508, and the delivery module 510. The second control unit 434 of FIG. 4 can execute the modules to perform the functions dynamically and in real time.

The second control unit 434 can execute the second software 442 for the condition module 502 to determine the surrounding condition 202. The second control unit 434 can execute the second software 442 for the context module 504 to determine the operating context 228.

The second control unit 434 can execute the second software 442 for the restriction module 506 to determine the feature availability 302. The second control unit 434 can execute the second software 442 for the notification module 508 to determine the alert notification 318. The second control unit 434 can execute the second software 442 for the delivery module 510 to deliver the alert notification 318.

The modules of the navigation system 100 can be partitioned between the first software 426 and the second software 442. The second software 442 can include the context module 504, the restriction module 506, the notification module 508, and the delivery module 510. The second control unit 434 can execute modules partitioned on the second software 442 as previously described.

The first software 426 can include the condition module 502. Based on the size of the first storage unit 414, the first software 426 can include additional modules of the navigation system 100. The first control unit 412 can execute the modules partitioned on the first software 426 as previously described.

The first control unit 412 can operate the first communication unit 416 of FIG. 4 to communicate the surrounding condition 202, the operating context 228, the feature availability 302, the alert notification 318, or a combination thereof to or from the second device 106 through the communication path 104 of FIG. 4. The first control unit 412 can operate the first software 426 to operate the location unit 420 of FIG. 4. The second control unit 434 can operate the second communication unit 436 of FIG. 4 to communicate the surrounding condition 202, the operating context 228, the feature availability 302, the alert notification 318, or a combination thereof to or from the first device 102 through the communication path 104.

The navigation system 100 describes the module functions or order as an example. The modules can be partitioned differently. For example, the notification module 508 and the delivery module 510 can be combined. Each of the modules can operate individually and independently of the other modules. Furthermore, data generated in one module can be used by another module without being directly coupled to each other. For example, the restriction module 506 can receive the surrounding condition 202 from the condition module 502. Further, one module communicating to another module can represent one module transmitting, sending, receiving, or a combination thereof the data generated to or from another module.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first control unit 412, the second control unit 434, or a combination thereof can collectively refer to all hardware accelerators for the modules. Furthermore, the first control unit 412, the second control unit 434, or a combination thereof can be implemented as software, hardware, or a combination thereof.

The modules described in this application can be implemented as instructions stored on a non-transitory computer readable medium to be executed by the first control unit 412, the second control unit 434, or a combination thereof. The non-transitory computer medium can include the first storage unit 414, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 6:
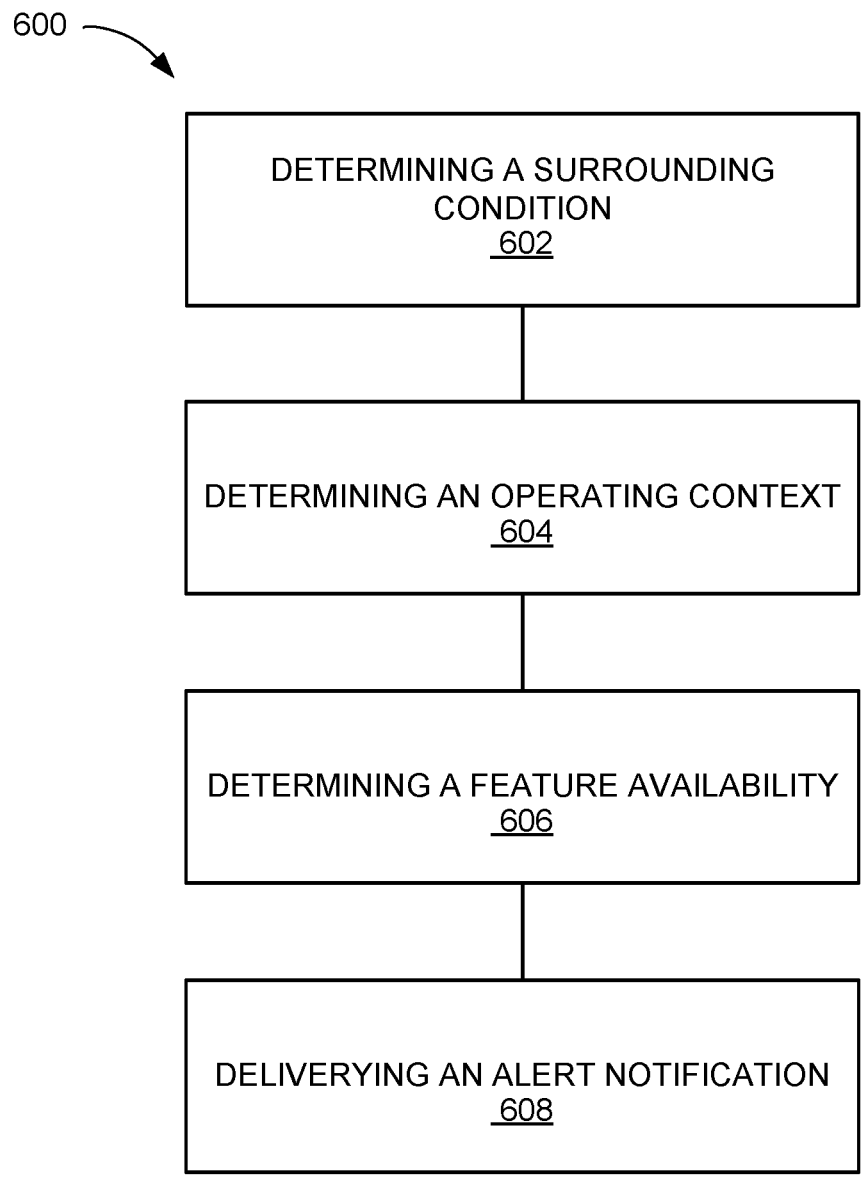
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: determining a surrounding condition with a control unit for selecting an input source to capture a surrounding object in a block 602; determining an operating context based on calculating an average stopped time meeting or exceeding a time threshold within the surrounding condition in a block 604; determining a feature availability based on the operating context for restricting a device feature available on a device in a block 606; and delivering an alert notification based on an object count below a count threshold for presenting on the device in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    determining a surrounding condition with a control unit for selecting an input source to capture a surrounding object;
    determining an operating context based on calculating an average stopped time meeting or exceeding a time threshold within the surrounding condition wherein the average stopped time represents an average of multiple time durations when a vehicle speed is at zero;
    determining a feature availability based on the operating context for restricting a device feature available on a device wherein the surrounding condition is captured by the input source having a source priority level being changed according to the change in the operation context; and
    delivering an alert notification including the feature availability based on an object count below a count threshold for presenting on the device.

2. The method as claimed in claim 1 wherein determining the operating context includes determining the operating context based on calculating the average stopped time when the object count meets or exceeds the count threshold.

3. The method as claimed in claim 1 wherein determining the operating context includes determining the operating context based comparing a heading angle difference to an operation threshold.

4. The method as claimed in claim 1 further comprising determining a safety level of the operating context based on comparing the object count to the count threshold.

5. The method as claimed in claim 1 further comprising determining a restriction level based on comparing the object count to the count threshold.

6. The method as claimed in claim 1 further comprising updating the input source representing a drone based on the surrounding condition for capturing the surrounding object at a vicinity further away from a current location than capturing with the device.

7. The method as claimed in claim 1 wherein determining the feature availability includes changing the feature availability of the device feature based on comparing a safety level to a safety threshold.

8. The method as claimed in claim 1 wherein determining the feature availability includes changing the feature availability based on changing a presentation timing of a presentation content according to the operating context.

9. The method as claimed in claim 1 further comprising determining a presentation timing based on comparing a safety level to a safety threshold.

10. The method as claimed in claim 1 further comprising determining a presentation duration based on comparing a safety level to a safety threshold.

11. A navigation system comprising:
    a control unit for:
        determining a surrounding condition with a control unit for selecting an input source to capture a surrounding object;
        determining an operating context based on calculating an average stopped time meeting or exceeding a time threshold within the surrounding condition wherein the average stopped time represents an average of multiple time durations when a vehicle speed is at zero;
        determining a feature availability based on the operating context for restricting a device feature available on a device wherein the surrounding condition is captured by the input source having a source priority level being changed according to the change in the operation context; and
    a communication unit, coupled to the control unit for delivering an alert notification including the feature availability based on an object count below a count threshold for presenting on the device.

12. The system as claimed in claim 11 wherein the control unit is for determining the operating context based on calculating the average stopped time when the object count meets or exceeds the count threshold.

13. The system as claimed in claim 11 wherein the control unit is for determining the operating context based comparing a heading angle difference to an operation threshold.

14. The system as claimed in claim 11 wherein the control unit is for determining a safety level of the operating context based on comparing the object count to the count threshold.

15. The system as claimed in claim 11 wherein the control unit is for determining a restriction level based on comparing the object count to the count threshold.

16. A non-transitory computer readable medium including instructions for execution, the instructions comprising:
    determining a surrounding condition for selecting an input source to capture a surrounding object;
    determining an operating context based on calculating an average stopped time meeting or exceeding a time threshold within the surrounding condition wherein the average stopped time represents an average of multiple time durations when a vehicle speed is at zero;
    determining a feature availability based on the operating context for restricting a device feature available on a device wherein the surrounding condition is captured by the input source having a source priority level being changed according to the change in the operation context; and
    delivering an alert notification including the feature availability based on an object count below a count threshold for presenting on the device.

17. The non-transitory computer readable medium as claimed in claim 16 wherein determining the operating context includes determining the operating context based on calculating the average stopped time when the object count meets or exceeds the count threshold.

18. The non-transitory computer readable medium as claimed in claim 16 wherein determining the operating context includes determining the operating context based comparing a heading angle difference to an operation threshold.

19. The non-transitory computer readable medium as claimed in claim 16 further comprising determining a safety level of the operating context based on comparing the object count to the count threshold.

20. The non-transitory computer readable medium as claimed in claim 16 further comprising determining a restriction level based on comparing the object count to the count threshold.

* * * * *